(12) United States Patent
Shi et al.

(10) Patent No.: US 11,619,786 B2
(45) Date of Patent: Apr. 4, 2023

(54) OPTICAL FIBER FERRULE AND OPTICAL FIBER CONNECTOR

(71) Applicant: HUAWEI TECHNOLOGIES CO., LTD., Guangdong (CN)

(72) Inventors: Hualiang Shi, Dongguan (CN); Banghong Hu, Dongguan (CN); Wei Fang, Shenzhen (CN); Chungang Li, Dongguan (CN); Yiguo Qi, Dongguan (CN); Juanjuan Cao, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 88 days.

(21) Appl. No.: 17/037,355

(22) Filed: Sep. 29, 2020

(65) Prior Publication Data

US 2021/0018701 A1    Jan. 21, 2021

Related U.S. Application Data (63) Continuation of application No. PCT/CN2019/081633, filed on Apr. 6, 2019.

(30) Foreign Application Priority Data

May 4, 2018    (CN) .......................... 201820658536.6

(51) Int. Cl.
    *G02B 6/38* (2006.01)
(52) U.S. Cl.
    CPC ......... *G02B 6/3885* (2013.01); *G02B 6/3882* (2013.01)
(58) Field of Classification Search
    CPC ... G02B 6/3869; G02B 6/3882; G02B 6/3885

USPC .......................................................... 385/78
See application file for complete search history.

(56) References Cited

U.S. PATENT DOCUMENTS

| | | |
|---|---|---|
| 2003/0087505 A1 | 5/2003 | Deane |
| 2003/0180012 A1 | 9/2003 | Deane et al. |
| 2004/0042733 A1 | 3/2004 | Kang et al. |
| 2004/0057671 A1* | 3/2004 | Kang .................. G02B 6/3885 385/71 |
| 2009/0097801 A1 | 4/2009 | Nishimura et al. |
| 2014/0153875 A1 | 6/2014 | Bradley et al. |

(Continued)

FOREIGN PATENT DOCUMENTS

| | | |
|---|---|---|
| CN | 1650211 A | 8/2005 |
| CN | 1685259 A | 10/2005 |
| JP | 2016057483 A | 4/2016 |

*Primary Examiner* — Michael P Mooney
(74) *Attorney, Agent, or Firm* — Womble Bond Dickinson (US) LLP (57) ABSTRACT

Embodiments of this application provide an optical fiber ferrule, where n rows of optical fiber holes are symmetrically distributed on a mating end face of the ferrule, n>=3, and n is an odd number. Based on the layout design of optical fiber holes on the optical fiber ferrule, this application provides an optical fiber connector that includes a plurality of rows of optical fiber holes and that is compatible with one row and a relatively small number of rows of optical fiber holes, so that an optical fiber connector with a large number of cores can be forward compatible with an optical fiber connector with a small number of cores, thereby improving expandability and compatibility of the optical fiber ferrule.

18 Claims, 5 Drawing Sheets

(56) References Cited

U.S. PATENT DOCUMENTS

2015/0104135 A1  4/2015  Bushnell et al.
2018/0329158 A1* 11/2018 Chang ................. G02B 6/3893

* cited by examiner

OPTICAL FIBER FERRULE AND OPTICAL FIBER CONNECTOR

CROSS-REFERENCE TO RELATED APPLICATIONS

This application is a continuation of International Application No. PCT/CN2019/081633, filed on Apr. 6, 2019, which claims priority to Chinese Patent Application No. 201820658536.6, filed on May 4, 2018. The disclosures of the aforementioned applications are hereby incorporated by reference in their entireties.

TECHNICAL FIELD

This application relates to the field of communications technologies, and in particular, to an optical fiber ferrule and an optical fiber connector.

BACKGROUND

In the all-optical network connection, as the data transmission rate and the bandwidth are increasing, the requirement for the number of optical fiber connector cores becomes higher. A multi-core pluggable optical fiber connector commonly used in the art is a Multi-fiber Push On (MPO) optical fiber connector. Generally, 12-core optical fibers are arranged in a row to support one or more rows of optical fibers in the same connector, and are commonly used in high-density optical fiber connection systems. The Monolithic Ferrule (MT) ferrule is a core component in an MPO connector and is a mechanical docking transmission ferrule. The ferrule is multi-core and includes one or more rows of optical fiber holes for connecting and transmitting optical signals.

With the increasing demand for MPO connectors and MT ferrule fiber cores, the number of cores in MT ferrule fibers in the industry currently evolves from 12 cores to 24 cores and then to 48 cores or from 16 cores to 32 cores. However, because the MT ferrule with a large number of fiber cores is incompatible with the MT ferrule with a small number of fiber cores, the future-generation products are incompatible with the previous-generation products.

SUMMARY

An embodiment of this application provides an optical fiber connector, which has high expandability and compatibility, and allows an optical fiber connector with a greater number of cores to be forward compatible with an optical fiber connector with a smaller number of cores.

According to one aspect, this application provides an optical fiber ferrule, where n rows of optical fiber holes are distributed on a mating end face of the ferrule, n>=3; and the mating end face of the ferrule is provided with two guide holes, and a center-connecting line between the guide holes is provided with a row of optical fiber holes.

In an embodiment, one of the n rows of optical fiber holes is distributed on the center-connecting line between the guide holes, and the other rows are symmetrically distributed on both sides of the center-connecting line.

In an embodiment, n=5, n=7, or n=9.

In an embodiment, a center distance between every two adjacent rows of optical fiber holes is 0.25 mm.

In an embodiment, the guide hole is 0.69 mm or 0.50 mm.

In an embodiment, there are 12 optical fiber holes in each odd row.

In an embodiment, there are 16 optical fiber holes in each odd row.

According to another aspect, this application provides an optical fiber ferrule, where n rows of optical fiber holes are symmetrically distributed on a mating end face of the ferrule, n>=3, and n is an even number; and the n rows of optical fiber holes are arranged parallel to each other.

In an embodiment, the n rows of optical fiber holes are symmetrically distributed on both sides of the center-connecting line between the guide holes.

In an embodiment, n=2, n=4, n=6, or n=8.

According to another aspect, this application provides an optical fiber connector, where the optical fiber connector includes the optical fiber ferrule according to any of the foregoing implementations.

Based on the layout design of optical fiber holes on the optical fiber ferrule, this application provides an optical fiber connector that includes a plurality of rows of optical fiber holes and that is compatible with one row and a relatively small number of rows of optical fiber holes, so that an optical fiber connector with a large number of cores can be forward compatible with an optical fiber connector with a small number of cores, thereby improving product expandability and compatibility.

DESCRIPTION OF EMBODIMENTS

Figure 1A:
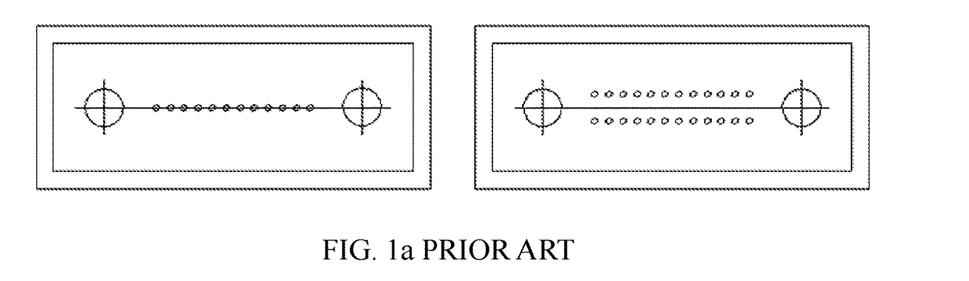
FIG. 1a is a schematic diagram showing an arrangement of a group of optical fiber holes in a conventional optical fiber ferrule.

FIG. 1*a* shows 12-core and 24-core MT ferrules in the prior art, where the 12-core MT ferrule is a first-generation product, and the 24-core MT ferrule is used when a subsequent product transmits a large amount of data. The ferrule s in FIG. 1*a* have the following problem: The subsequent 24-core ferrule features a symmetric distribution and is incompatible with a 12-core ferrule, so that the subsequent products are incompatible with the first-generation product.

Figure 1B:
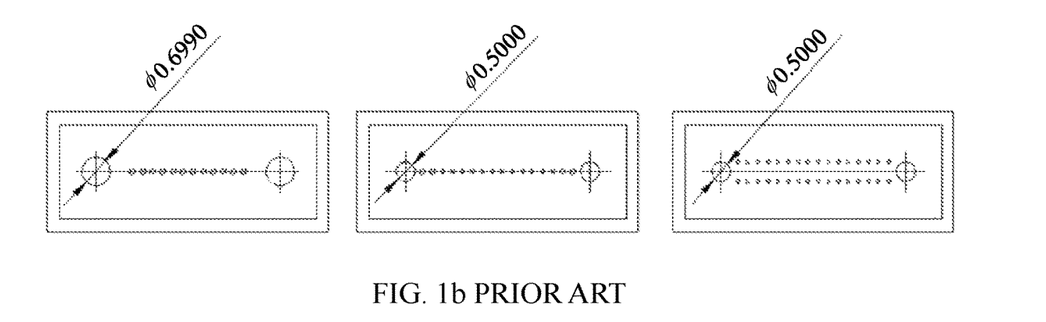
FIG. 1b is a schematic diagram showing an arrangement of another group of optical fiber holes in a conventional optical fiber ferrule.

FIG. 1*b* shows 12-core, 24-core, and 48-core MT ferrule in the prior art, where the 12-core and 24-core MT ferrules are first-generation products, and the 48-core MT ferrule is used when a subsequent product transmits a large amount of data. The ferrules in FIG. 1*b* also have the foregoing problem: The subsequent 48-core ferrule features a symmetric distribution and is incompatible with a 12-core ferrule; in addition, the industry's common 48-core spacing is inconsistent with the 24-core spacing and is incompatible with the 24-core ferrule, so that the subsequent product is incompatible with the first-generation products.

Figure 1C:
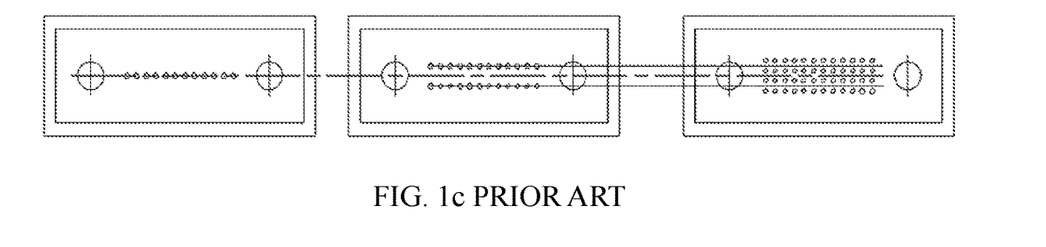
FIG. 1c is a schematic diagram showing an arrangement of still another group of optical fiber holes in a conventional optical fiber ferrule.

FIG. 1*c* shows 12-core, 16-core, and 32-core MT ferrules in the prior art, where the 12-core MT ferrule is a first-generation product, and the 16-core or 32-core MT ferrule is used when a subsequent product transmits a large amount of data. The ferrule s in FIG. 1*c* have the following problem: The diameter of each guide hole of the 16-core and 32-core MT ferrules is 0.5 mm, and the diameter of each guide hole of the 12-core MT ferrule is 0.6990 mm; because of the different diameters of the guide holes, the 16-core and 32-core MT ferrules are incompatible with the 12-core MT ferrule. In addition, because the 32-core MT ferrule features a symmetric distribution, the 32-core MT ferrule is incompatible with the 16-core MT ferrule. Consequently, the 32-core MT ferrule is incompatible with the 12-core and 16-core MT ferrules, and subsequent products are incompatible with the first-generation product.

Figure 2:
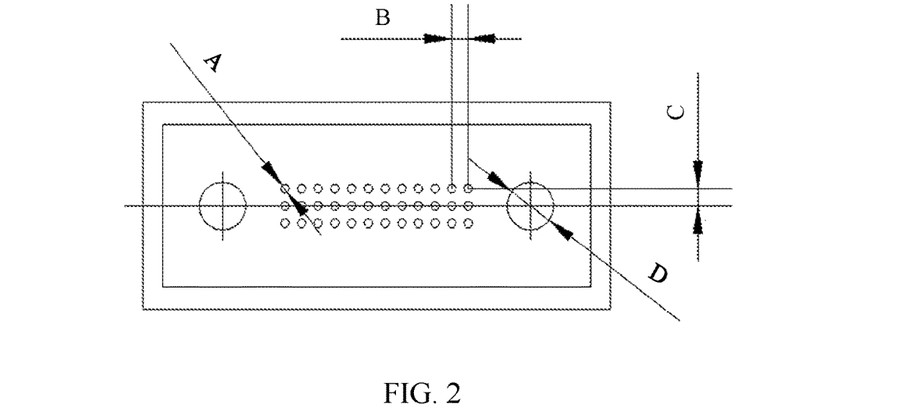
FIG. 2 is a schematic diagram showing an arrangement of optical fiber holes in an optical fiber ferrule according to an embodiment of this application.
Figure 3:
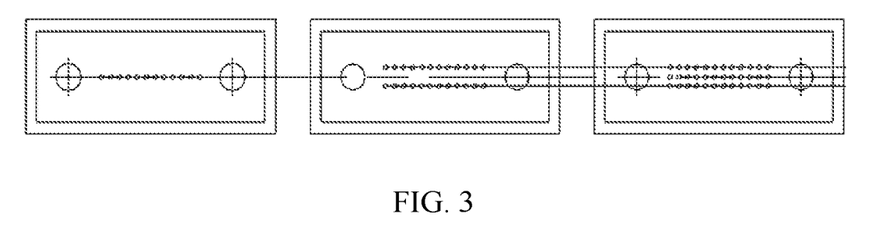
FIG. 3 is a schematic diagram showing compatibility of an optical fiber ferrule according to an embodiment of this application.

FIG. 2 is a schematic diagram of an arrangement of optical fiber holes in an optical fiber ferrule according to an embodiment of this application. As shown in FIG. 2, the optical fiber ferrule includes three rows of through-going optical fiber holes on the mating end face, and the optical fiber ferrule is compatible with the optical fiber ferrules with one and two rows of optical fiber holes in FIG. 3. The optical fiber ferrule with one row/two rows of optical fiber holes in FIG. 3 may be a 12-core/24-core MT ferrule in the prior art, or may be an optical fiber ferrule with one row/two rows of optical fiber holes of another specification. That is, to ensure that the optical fiber ferrule with three rows of optical fiber roles in FIG. 2 is compatible with the optical fiber ferrule with one or two rows of optical fiber holes in FIG. 3, the distance C between the upper center-connecting line (that is, the center-connecting line of the upper row of optical fiber holes and the guide hole in the upper row) and the lower center-connecting line (that is, the center-connecting line of the lower row of optical fiber holes and the guide hole in the lower row), the distance B between every two adjacent optical fiber holes, and the number of optical fiber holes in each row are designed to correspond to the optical fiber ferrule with two rows of optical fiber holes; and the position and the distance between the optical fiber holes in the center-connecting line of the guide hole, and the number of optical fiber holes in each row may be designed to correspond to the optical fiber ferrule with one row of optical fiber holes; and the diameter D of the guide hole and the diameter A of the optical fiber hole are matched.

In one embodiment, when the MT ferrule with three rows of optical fiber holes in FIG. 2 needs to be compatible with the 12-core and 24-core MT ferrules in the prior art, the diameter of the guide hole may be set to 0.6990 mm, and the center distance between every two adjacent rows of optical fiber holes may be set to half of that of the 24-core MT ferrule, that is, 0.25 mm. The diameter of the optical fiber hole and the distance between every two adjacent optical fiber holes in the same row are the same as those of the 12-core and 24-core MT ferrules. The number of optical fiber holes in each row is 12, and the three rows of optical fiber holes are symmetrically distributed along the center axis of the guide holes. In addition, the optical fiber holes are symmetrically distributed along the mid-perpendicular of the center axis of the guide holes.

The foregoing description is only a specific example. Values such as the number of optical fiber holes in each row, the diameter of the guide hole, the center distance between every two adjacent rows of optical fiber holes, and the distance between the holes in the same row, can be set to values different from the foregoing values as required, so as to ensure compatibility with the desired optical fiber ferrule.

The optical fiber ferrule in FIG. 2 may be formed through injection molding.

According to the foregoing optical fiber ferrule having three rows of through-going optical fiber holes, when the first-generation product uses an optical fiber ferrule with one or two rows of optical fiber holes to reduce costs, the second-generation product can select an optical fiber ferrule with three rows of optical fiber holes shown in FIG. 2 based on the performance requirements, so as to ensure forward compatibility and improve product competitiveness.

Figure 4:
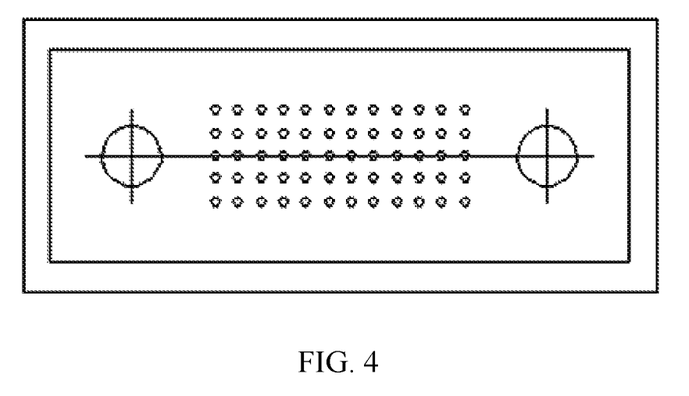
FIG. 4 is a schematic diagram showing an arrangement of optical fiber holes in another optical fiber ferrule according to an embodiment of this application.
Figure 5:
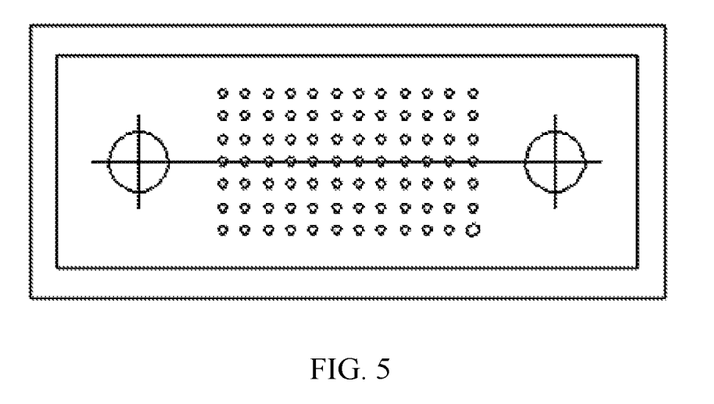
FIG. 5 is a schematic diagram showing an arrangement of optical fiber holes in another optical fiber ferrule according to an embodiment of this application.
Figure 6:
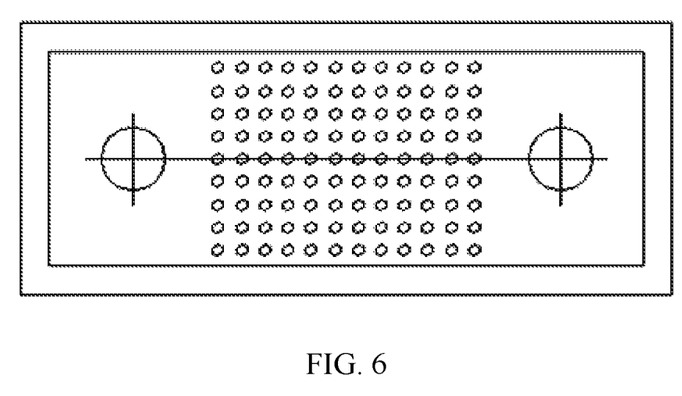
FIG. 6 is a schematic diagram showing an arrangement of optical fiber holes in another optical fiber ferrule according to an embodiment of this application.

In addition to the optical fiber ferrule with three rows of optical fiber holes in FIG. 2, when the transmission rate and bandwidth requirements become higher, optical fiber ferrules with five, seven, and nine rows of optical fiber holes (which are respectively shown in FIG. 4, FIG. 5, and FIG. 6) and even a greater odd number of rows of optical fiber holes can be designed in this embodiment of this application, to ensure forward compatibility with other ferrules. For example, the optical fiber ferrule with nine rows of optical fiber holes shown in FIG. 5 is compatible with the optical fiber ferrules with one, two, three, five, and seven rows of optical fiber holes.

The diameter of the guide hole, the diameter of the optical fiber hole, and the inter-row center distance, and the distance between every two adjacent optical fiber holes in the same row are similar to those in FIG. 2*c*; and the corresponding parameters of the ferrule are set based on the diameter of the guide hole, the diameter of the optical fiber hole, and the inter-row center distance, and the distance between every two adjacent optical fiber holes in the same row.

Likewise, the optical fiber ferrule may be formed through injection molding.

Figure 7:
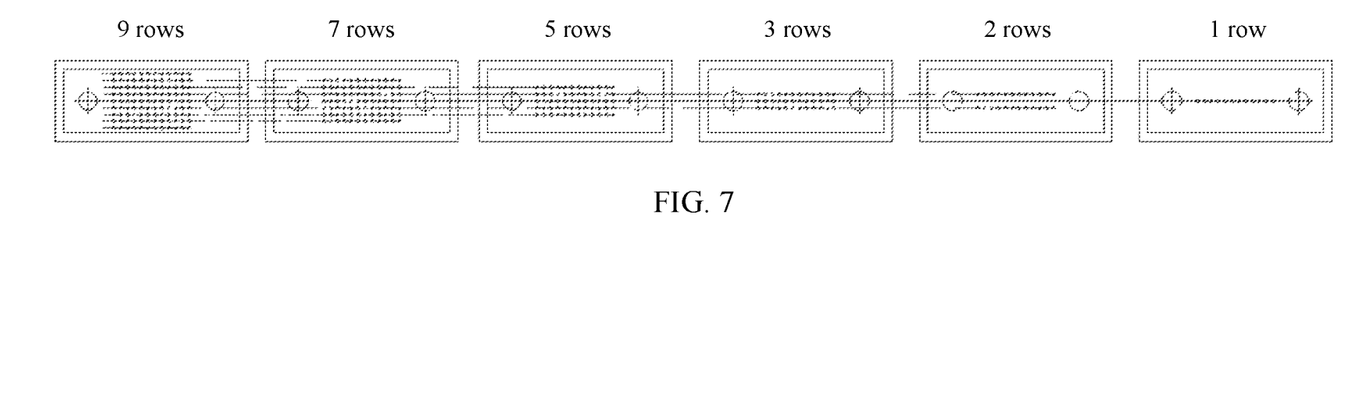
FIG. 7 is a schematic diagram showing compatibility of an optical fiber ferrule according to an embodiment of this application.

FIG. 7 is a schematic diagram showing compatibility of an optical fiber ferrule according to an embodiment of this application. The optical fiber ferrule with a plurality of optical fiber holes according to this application is forward compatible: The optical fiber ferrule with three rows of optical fiber holes is compatible with the optical fiber ferrule with one or two rows of optical fiber holes; the optical fiber ferrule with five rows of optical fiber holes is compatible with the optical fiber ferrule with one, two, or three rows of optical fiber holes; the optical fiber ferrule with seven rows of optical fiber holes is compatible with the optical fiber ferrule with one, two, three, or five rows of optical fiber holes; and the optical fiber ferrule with nine rows of optical fiber holes is compatible with the optical fiber ferrule with one, two, three, five, or seven rows of optical fiber holes. For example, using the optical fiber ferrule with 12 optical fiber roles in each row as an example, the 36-core solution is fully compatible with the 12-core or 24-core optical fiber ferrule; the 60-core solution is compatible with the 12-core, 24-core, or 36-core optical fiber ferrule; the 84-core solution is compatible with the 12-core, 24-core, 36-core, or 60-core optical fiber ferrule; and the 108-core solution is compatible with the 12-core, 24-core, 36-core, 60-core, and 84-core optical fiber ferule. The optical fiber ferrule with 12 optical fiber holes in each row is merely an example. The optical fiber ferrule may be designed to provide 16 or another number of optical fiber holes in each row as required.

In addition to the foregoing compatibility, the optical fiber ferrule with five rows of optical fiber holes may be compatible with the optical fiber ferrule with two or four rows of optical fiber holes by setting the inter-row distance; the optical fiber ferrule with seven rows of optical fiber rows may be compatible with the optical fiber ferrule with two, four, or six rows of optical fiber holes by setting the inter-row distance; and the optical fiber ferrule with nine rows of optical fiber rows may be compatible with the optical fiber ferrule with two, four, six, or eight rows of optical fiber holes by setting the inter-row distance.

In addition to the foregoing embodiments, the optical fiber ferrule of this application may be designed to be an optical fiber ferrule with an even number of rows of optical fiber holes that are symmetrically distributed in parallel. For example, for the optical fiber ferrule with two, four, six, or eight rows of optical fiber holes, the center distances between every two adjacent rows of optical fiber holes in the optical fiber ferrules with different numbers of rows of optical fiber holes are the same or match with each other, and the rows of optical fiber holes are symmetrically distributed along the center-connecting line of the guide holes, so that the optical fiber ferrule with an even number of optical fiber holes is forward compatible, for example, the optical fiber ferrule with eight rows of optical fiber holes is compatible with the optical fiber ferrule with two, four, or six rows of optical fiber holes.

Figure 8:
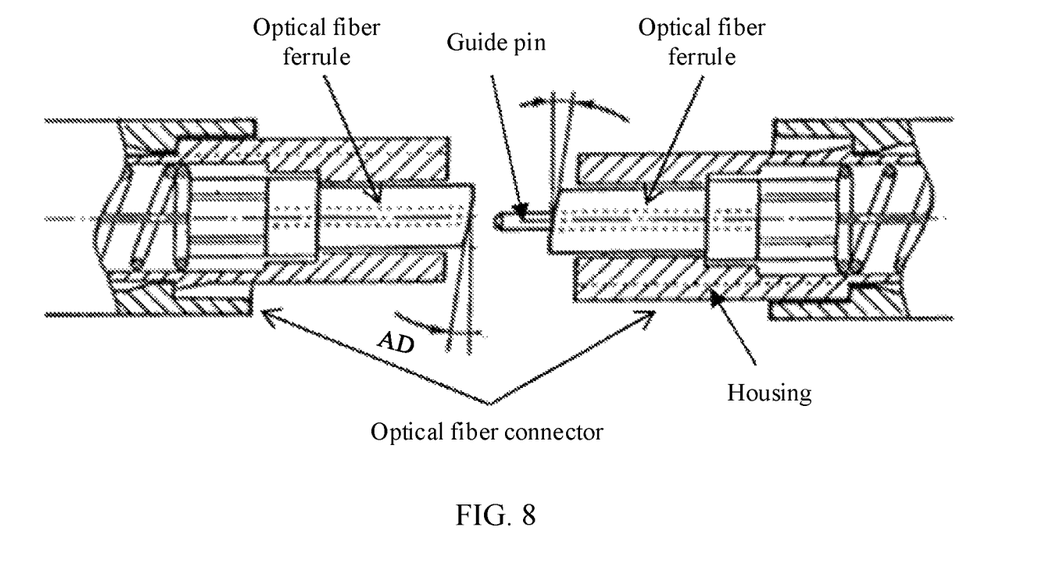
FIG. 8 is a schematic structural diagram showing an optical fiber connector according to an embodiment of this application.

FIG. 8 is a schematic structural diagram showing an optical fiber connector according to an embodiment of this application. As shown in FIG. 8, the optical fiber connector includes a housing whose front end is a plug end, and in the housing, an optical fiber ferrule with guide holes or guide pins are fastened using a fastening member. The ferrule in the connector is the optical fiber ferrule mentioned in the foregoing embodiments of this application, and is configured to connect to a plurality of rows of optical fiber holes, to transmit optical signals. The ferrule is forward compatible with the previous-generation products with a smaller number of rows of optical fiber holes.

The foregoing design mode can ensure that the product is forward compatible and improves product competitiveness. The previous-generation product can use an MT ferrule with a smaller number of rows of optical fiber holes to reduce costs, and the next-generation product can select an optical fiber ferrule with a greater number of rows of optical fiber holes based on the performance requirements to be compatible with the previous-generation product, thereby ensuring forward compatibility and improving product competitiveness.

The invention claimed is:

1. An optical fiber ferrule, comprising
a mating end face; and
a plurality of rows of optical fiber holes symmetrically distributed on the mating end face of the optical fiber ferrule, wherein a number of the plurality of rows of the optical fiber holes is n, wherein n>=3, wherein n is an odd number, wherein the plurality of rows of the optical fiber holes are arranged parallel to each other,
wherein the mating end face of the optical fiber ferrule includes two guide holes, and wherein a first row of the plurality of rows of the optical fiber holes is distributed on a center-connecting line between the two guide holes,
wherein rows of the plurality of rows of optical fiber holes other than the first row are symmetrically distributed on both sides of the center-connecting line between the two guide holes, and
wherein the optical fiber ferrule is configured to be fastened to a second optical fiber ferrule, the second optical fiber ferrule comprising a second mating end face and a second plurality of rows of optical fiber holes symmetrically distributed on the second mating end face, wherein a number of the second plurality of rows of the optical fiber holes is m, wherein m>=2, wherein m is an even number, and wherein the second plurality of rows of the optical fiber holes are arranged parallel to each other.

2. The optical fiber ferrule according to claim 1, wherein the odd number includes 3.

3. The optical fiber ferrule according to claim 1, wherein the odd number includes 5.

4. The optical fiber ferrule according to claim 1, wherein a center distance between every two adjacent rows of the plurality of rows of the optical fiber holes is 0.25 mm.

5. The optical fiber ferrule according to claim 1, wherein each row of the plurality of rows of the optical fiber holes comprises 12 optical fiber holes.

6. The optical fiber ferrule according to claim 1, wherein each row of the plurality of rows of the optical fiber holes comprises 16 optical fiber holes.

7. An optical fiber connector, comprising
a housing having a front end, the front end being a plug end, the housing including an optical fiber ferrule including a mating end face and a plurality of rows of optical fiber holes symmetrically distributed on the mating end face of the optical fiber ferrule, wherein a number of the plurality of rows of the optical fiber holes is n, wherein n>=3, wherein n is an odd number, wherein the plurality of rows of the optical fiber holes are arranged parallel to each other,
wherein the mating end face of the optical fiber ferrule includes two guide holes, and wherein a first row of the plurality of rows of the optical fiber holes is distributed on a center-connecting line between the two guide holes,
wherein rows of the plurality of rows of optical fiber holes other than the first row are symmetrically distributed on both sides of the center-connecting line between the two guide holes, and
wherein the optical fiber ferrule is configured to be fastened to a second optical fiber ferrule, the second optical fiber ferrule comprising a second mating end face and a second plurality of rows of optical fiber holes symmetrically distributed on the second mating end face, wherein a number of the second plurality of rows of the optical fiber holes is m, wherein m>=2, wherein m is an even number, and wherein the second plurality of rows of the optical fiber holes are arranged parallel to each other.

8. The optical fiber connector according to claim 7, wherein the odd number includes 3.

9. The optical fiber connector according to claim 7, wherein the odd number includes 5.

10. The optical fiber connector according to claim 7, wherein a center distance between every two adjacent rows of the plurality of rows of the optical fiber holes is 0.25 mm.

11. The optical fiber connector according to claim 7, wherein each row of the plurality of rows of the optical fiber holes comprises 12 optical fiber holes.

12. The optical fiber connector according to claim 7, wherein each row of the plurality of rows of the optical fiber holes comprises 16 optical fiber holes.

13. An optical fiber connector system comprising:
a first optical fiber ferrule comprising a first mating end face and a first plurality of rows of optical fiber holes symmetrically distributed on the first mating end face, wherein a number of the first plurality of rows of the optical fiber holes is n, wherein n>=3, wherein n is an odd number, and wherein the first plurality of rows of the optical fiber holes are arranged parallel to each other; and
a second optical fiber ferrule fastened to the first optical fiber ferrule, the second optical fiber ferrule comprising a second mating end face and a second plurality of rows of optical fiber holes symmetrically distributed on the second mating end face, wherein a number of the second plurality of rows of the optical fiber holes is m, wherein m>=2, wherein m is an even number, and wherein the second plurality of rows of the optical fiber holes are arranged parallel to each other,
wherein a first arrangement of the first plurality of rows of optical fiber holes of the first optical fiber ferrule is compatible with a second arrangement of the second plurality of rows of optical fiber holes of the second optical fiber ferrule.

14. The optical fiber connector system according to claim 13, wherein the odd number includes 3.

15. The optical fiber connector system according to claim 13, wherein the odd number includes 5.

16. The optical fiber connector system according to claim 13 wherein each row of the first plurality of rows of the optical fiber holes and each row of the second plurality of rows of the optical fiber holes comprises 12 optical fiber holes or each row of the first plurality of rows of the optical fiber holes and each row of the second plurality of rows of the optical fiber holes comprises 16 optical fiber holes.

17. The optical fiber connector system according to claim 13, wherein the first mating end face of the first optical fiber ferrule includes two guide holes, and wherein a first row of the first plurality of rows of the optical fiber holes is distributed on a center-connecting line between the two guide holes.

18. The optical fiber connector system according to claim 17, wherein rows of the first plurality of rows of optical fiber holes other than the first row are symmetrically distributed on both sides of the center-connecting line between the two guide holes.

* * * * *